United States Patent
Schaferlein

(10) Patent No.: US 11,636,770 B2
(45) Date of Patent: Apr. 25, 2023

(54) METHOD AND APPARATUS FOR MONITORING THE TAKE-OFF AND LANDING PROCEDURE OF AN AIRCRAFT AND SYSTEM

(71) Applicant: Volocopter GmbH, Bruchsal (DE)

(72) Inventor: Ulrich Schaferlein, Karlsdorf-Neuthard (DE)

(73) Assignee: Volocopter GmbH, Bruchsal (DE)

( * ) Notice: Subject to any disclaimer, the term of this patent is extended or adjusted under 35 U.S.C. 154(b) by 275 days.

(21) Appl. No.: 17/076,933

(22) Filed: Oct. 22, 2020

(65) Prior Publication Data

US 2021/0150919 A1    May 20, 2021

(30) Foreign Application Priority Data

Nov. 14, 2019   (DE) .......................... 102019130694.9

(51) Int. Cl.
| | |
|---|---|
| *G08G 5/00* | (2006.01) |
| *H04R 29/00* | (2006.01) |
| *B64F 5/60* | (2017.01) |
| *G08G 5/02* | (2006.01) |
| *G01H 9/00* | (2006.01) |
| *G01S 13/91* | (2006.01) |

(52) U.S. Cl.
CPC ............ *G08G 5/0082* (2013.01); *B64F 5/60* (2017.01); *G01H 9/002* (2013.01); *G01S 13/913* (2013.01); *G08G 5/0065* (2013.01); *G08G 5/0095* (2013.01); *G08G 5/02* (2013.01); *H04R 29/001* (2013.01)

(58) Field of Classification Search
CPC .. G08G 5/0082; G08G 5/0065; G08G 5/0095; G08G 5/02; B64F 5/60; G01H 9/002; G01S 13/913; H04R 29/001
See application file for complete search history.

(56) References Cited

U.S. PATENT DOCUMENTS

| | | | |
|---|---|---|---|
| 8,059,489 B1 * | 11/2011 | Lee .................. | G01N 29/46 367/136 |
| 9,213,099 B1 * | 12/2015 | Nielsen ............ | G01S 15/003 |
| 9,632,171 B1 * | 4/2017 | Herold ............. | G01S 3/801 |
| 9,663,237 B2 | 5/2017 | Senkel et al. | |
| 10,032,464 B2 * | 7/2018 | Franklin ........... | G10L 25/39 |

(Continued)

FOREIGN PATENT DOCUMENTS

| | | |
|---|---|---|
| CN | 102473338 | 5/2012 |
| CN | 101464212 | 7/2012 |

(Continued)

*Primary Examiner* — Dale W Hilgendorf
(74) *Attorney, Agent, or Firm* — Volpe Koenig

(57) ABSTRACT

A method for monitoring the take-off and/or landing procedure of an aircraft (1), in particular for an electrical, vertical take-off and landing aircraft (1), in which a monitoring region of a take-off and landing site (2) is monitored by at least one microphone (4, 5) of a monitoring station to detect sound emission data of an aircraft (1) taking off or landing as it approaches or departs and the detected sound emission data are transmitted from the monitoring station to an evaluation unit. The detected sound emission data are evaluated by the evaluation unit by comparing the detected sound emission data to characteristic sound emission data.

16 Claims, 2 Drawing Sheets

(56) References Cited

U.S. PATENT DOCUMENTS

| | | | | |
|---|---|---|---|---|
| 2009/0257314 A1* | 10/2009 | Davis | ................... | G01S 5/18 |
| | | | | 367/125 |
| 2010/0284249 A1* | 11/2010 | Steadman | ............ | G08B 13/1672 |
| | | | | 367/118 |
| 2015/0040650 A1* | 2/2015 | Lacaille | ................ | G07C 5/0808 |
| | | | | 73/112.01 |
| 2015/0302858 A1* | 10/2015 | Hearing | ................... | G10L 25/18 |
| | | | | 381/58 |
| 2022/0312152 A1* | 9/2022 | Sundström | ............ | H04W 52/0258 |

FOREIGN PATENT DOCUMENTS

| | | | | |
|---|---|---|---|---|
| CN | 104870969 | 8/2015 | | |
| CN | 105509766 | 4/2016 | | |
| CN | 107065912 | 8/2017 | | |
| CN | 109941455 | 6/2019 | | |
| CN | 110337587 | 10/2019 | | |
| DE | 102012202698 | 8/2013 | | |
| DE | 102016114334 | 2/2018 | | |
| EP | 2538210 A2 * | 12/2012 | ............ | G01N 29/14 |
| FR | 2973877 | 10/2012 | | |

* cited by examiner

METHOD AND APPARATUS FOR MONITORING THE TAKE-OFF AND LANDING PROCEDURE OF AN AIRCRAFT AND SYSTEM

INCORPORATION BY REFERENCE

The following documents are incorporated herein by reference as if fully set forth: German Patent Application No. 10 2019 130 694.9, filed Nov. 14, 2019.

TECHNICAL FIELD

The present invention relates to a method for monitoring the take-off and/or landing procedure of an aircraft, to an apparatus for monitoring the take-off and/or landing procedure of an aircraft, and to a system for monitoring the take-off and/or landing procedure of an aircraft.

BACKGROUND

Vertical take-off and landing aircraft, also known as VTOL aircraft, are used for transporting people, either autonomously or controlled by an accompanying pilot, and also for transporting payloads, either remote-controlled or autonomously. Such vertical take-off and landing aircraft are known, for example from DE 10 2012 202 698 A1 by the applicant.

When operating vertical take-off and landing aircraft, safety plays an important role. However, this does not only relate to the crash safety for passengers or pilots. Since vertical take-off and landing aircraft are intended to be used directly in inhabited areas, in particular in urban areas, safe take-off and landing and also a safe flight over an inhabited area are of the utmost importance.

SUMMARY

The invention is therefore based on the object of providing a method and an apparatus that allow the simple early detection of anomalies and defects of an aircraft so as to increase flight safety.

This object is achieved by a method with one or more of the features described herein. Advantageous configurations of the method according to the invention can be found below and in the claims.

This object is furthermore achieved by an apparatus having one or more of the features described herein. Advantageous configurations of the apparatus according to the invention are also found below and in the claims.

The system according to the invention likewise solves the object according to the invention. Advantageous configurations of the system according to the invention are described below and in the claims.

The method according to the invention for monitoring the take-off and landing procedure of an aircraft, includes:
  A a monitoring region of a take-off and landing site is monitored by at least one microphone of a monitoring station to detect sound emission data of an aircraft taking off or landing as it approaches or departs,
  B the detected sound emission data are transmitted from the monitoring station to an evaluation unit, and
  C the detected sound emission data are evaluated by the evaluation unit by comparing the detected sound emission data to characteristic sound emission data.

A vertical take-off or landing aircraft generates sound emissions that have a variety of causes. Typically, the sound emissions are primarily made up of aerodynamic noise and motor/rotor noise. Aerodynamic noise typically refers to sounds caused by the airflow around the components of the aircraft. This airflow causes pressure waves, i.e. noise.

The motor/rotor noise is due to the sounds that occur during the operation of the electric motors, the proportion thereof being very low, and due to the sounds that occur from the movement of the rotor blades. It is furthermore possible for mechanical noise to occur for example if parts of the support structure of an aircraft are exposed to local strong vibrations due to defects. In conventional helicopters, additional noise is generated by the engine or engines. In electrical vertical take-off and landing aircraft such as a Volocopter® aircraft by the applicant, the noise generated by the electric motors, in contrast, is much lower.

The invention is based on the finding by the applicant that the detection of said sound emission data provides information relating to the condition of the aircraft. A comparison of the detected sound emission data to characteristic sound emission data allows deviations between the detected sound emission data and the characteristic emission data to be established and thus conclusions to be drawn relating to the condition of the aircraft. Defects, such as moving parts, loose lock pins, or anomalies in the motor operation, lead to changes in the sound emissions.

The comparison in method step C is preferably based on characteristic sound emission data of the same type of aircraft, for example from a database. A comparison between the detected sound emission data and the characteristic sound emission data for the selected type of aircraft makes it possible to establish deviations that allow conclusions to be drawn relating to defects of the aircraft.

In a preferred embodiment of the method according to the invention, the comparison in method step C is based on a comparison of the frequency spectrum and/or amplitude of characteristic approach or departure sound emissions of the same type of aircraft. The frequency and amplitude can be recorded in a known manner and be compared to stored data for the specific type of aircraft.

The comparison is preferably effected in an automated manner by way of the evaluation unit. For example, the automated comparison is performed by an algorithm running on a processor that compares the detected sound emission data based on the frequency field and/or amplitude to the characteristic sound emission data of the known aircraft type.

It is here within the scope of the invention that the evaluation unit is part of the aircraft, for example part of the avionics. However, the evaluation unit can also be embodied outside of the aircraft, preferably together with the controller and/or as part of a ground unit.

In the case of significant deviations of the frequency spectrum and/or amplitude, conclusions can be drawn relating to a defect, such as loose parts, lock pins, or anomalies in motors. Such significant deviations can occur, for example, due to the loosening of a lock pin on the support structure or due to the loosening of a connection between two structural parts of the support structure. In such a case, additional frequencies occur in the frequency spectrum that arise due to sound emissions of the loosened parts.

"Significant deviations between the detected sound emission data and the characteristic sound emission data" within the scope of the present specification means that the deviations in the frequency spectrum and/or with respect to the amplitude lie outside a specific tolerance range. The frequency spectrum and/or amplitude do of course not match completely even for identical types of aircraft but rather have specific small deviations. However, these small deviations do not indicate defects but are rather due, for example, to environmental conditions, approach and departure speed, or interfering noise.

At what point deviations are considered significant deviations caused by defects of the aircraft depends on the type of the aircraft. The number and arrangement of the rotors, the construction of the support structure of the aircraft, material, and the like here play crucial roles.

In a further embodiment of the invention, a notification is issued to a controller if there is a significant deviation between the detected sound emission data and the characteristic sound emission data. The controller can here be part of the aircraft, for example by virtue of the pilot being informed. However, the controller can also be embodied to be outside of the aircraft, for example as part of a ground unit. In this case, the notification can take the form of a maintenance request, for example, with the result that ground staff is informed as soon as the aircraft approaches for landing that maintenance measures are required before the aircraft takes off again. Clearance for take-off can be issued or denied depending on an evaluation of the notification issued to the controller. Preferably, an active clearance for take-off must be given after a maintenance request to ensure safe redeployment.

In a preferred embodiment of the method according to the invention, the detected sound emission data with established significant deviations are stored in the database. The frequency spectrum and/or amplitude of the detected sound emission data are preferably stored in the database and, after a significant deviation has been identified and after the cause of it has been evaluated, are labeled with the corresponding cause for the significant deviation. Sound emission data that are detected in the future can be compared to the stored sound emission data so as to allow conclusions to be drawn even during the approach for landing, which defect is the cause of the significant deviation. This results in the advantage that the method allows the continuous improvement of the database foundation and thus of the quality of the evaluation in a self-learning manner.

Detected sound emission data that do not deviate significantly from the characteristic sound emission data are preferably likewise stored in the database. In this way, the data set of sound emission data that indicate an aircraft without any defect grows. For the reasons described above, this results in the advantage that the quality of the evaluation is improved with each stored set of sound emission data. Sensors that are previously known from the prior art can be used to this end for the required data.

The present object of the invention is further achieved by an apparatus for monitoring the take-off and/or landing procedure of an aircraft.

As is known per se, such an apparatus comprises a monitoring station with at least one microphone to detect sound emissions of an aircraft taking off or landing as it approaches or departs in a monitoring region of a take-off and/or landing site.

What is significant is that the apparatus comprises at least one processor-based evaluation unit that is embodied to receive the sound emission data from the monitoring station and is configured to evaluate the sound emission data by comparing the detected sound emission data to characteristic sound emission data of the same type of aircraft.

The apparatus according to the invention likewise has the previously mentioned advantages of the method according to the invention or of the preferred embodiments of the method according to the invention.

In a preferred embodiment of the invention, the monitoring station has a plurality of microphones that cover the monitoring region of the take-off and landing site by way of sensor technology. The monitoring station preferably has at least two microphones, preferably at least four microphones. The number of the microphones depends on the size of the monitoring region and can also be influenced by environmental conditions such as buildings that are located nearby, the potential approach and departure path, etc. The monitoring region according to the invention is here not only the corresponding surface area of the take-off and landing site but also the corresponding space, that is to say the volume above the corresponding surface area of the take-off and landing site.

Four microphones advantageously ensure sufficient coverage because the microphones can be placed for example in the shape of a square and thus ensure a surface-covering and space-covering coverage of the monitoring region.

In a preferred development of the invention, the microphones are arranged symmetrically on both sides along an approach or departure path of the aircraft. In particular symmetrically designed aircraft have an approximately symmetric noise emission. Environmental factors such as wind may certainly falsify the noise emission profile. However, such effects can typically be computationally removed with manageable outlay.

The symmetric noise emission can be used to compare microphones that are directly assigned to one another and are arranged symmetrically on both sides along an approach or departure path of the aircraft. In the simple case, these are a left and a right microphone with respect to the approach or departure path of the aircraft. Defects on the aircraft in most cases result in an asymmetric emission. This means a further possibility for a comparison that makes possible the discovery of anomalies of the aircraft.

The microphones, preferably in each case two microphones, are preferably oriented so as to face one another. As described above, such an arrangement in pairs, in particular symmetrically in pairs, allows a simple identification of anomalies.

In a preferred embodiment of the invention, the microphones have an inclined placement, preferably at an angle of less than 40°, preferably less than 20°, with particular preference less than or equal to 10°, in relation to the ground. Due to this inclined placement, the microphones increasingly record sound emissions that originate in the rotor plane and thus from the support structure and the motor/rotor combinations.

Aerodynamic noise that arises from the displacement of air by the aircraft as such propagates substantially directly downward in the direction of the ground. The sound emissions coming from the rotor plane propagate particularly strongly in the rotor plane, that is to say typically in the horizontal at the height of the aircraft, and directly below the aircraft. Therefore, there is an angular range that is relatively flat and in which other sources of noise are more easily detectable. In such a relatively flat angular range, the sound emissions due to the aerodynamic noise also decrease and fewer interfering superpositions occur.

A similar effect can be achieved by a minimum distance between the microphones and the take-off and landing site. The at least two microphones preferably have a minimum distance of approximately 20 meters, preferably more than 30 meters, with particular preference approximately 60 meters each. The aerodynamic noise of the aircraft in this embodiment also propagates substantially directly downward in the direction of the ground, while the sound emissions from the motor/rotor plane can be detected by the spaced-apart microphones. This results in the advantage that the aerodynamic noise that is of relatively little interest is not detected, or detected to a lesser extent, and thus does not interfere with the regions of interest in the frequency spectrum and/or amplitude image. A "mechanical filter" is thus realized, as it were.

If a take-off and landing site is located for example in a city on the roof of a high-rise building, the microphones can also be arranged on adjacent roofs to observe the preferred minimum distance from the take-off and landing site. However, a field of view from the microphones to the take-off and landing site must be free in such a case.

The object according to the invention is furthermore achieved by a system having one or more features described herein.

The system for monitoring the take-off and/or landing procedure of an aircraft comprises a monitoring station with at least one microphone to detect sound emission data of an aircraft taking off or landing as it approaches or departs in a monitoring region of a take-off and landing site.

What is significant is that the system comprises at least one processor-based evaluation unit that is embodied to receive the sound emission data from the monitoring station and is configured to evaluate the sound emission data. The evaluation takes place such that the detected sound emission data are compared to characteristic sound emission data of the same type of aircraft. The system additionally comprises at least one database that is connected to the evaluation unit by communication technology. This database is configured and embodied to provide the characteristic sound emission data.

The system according to the invention likewise has the previously mentioned advantages of the method according to the invention or of the apparatus according to the invention and the preferred embodiments thereof.

In a preferred embodiment of the invention, the system comprises a controller. The controller and the evaluation unit are preferably configured and designed to send a notification to the controller if there is a deviation between the detected sound emission data and the characteristic sound emission data. The notification is preferably in the form of an inspection request. This results in the advantage that a ground team is informed about the inspection request as soon as the aircraft approaches. Alternatively or in addition, clearance for take-off can be issued or denied depending on an evaluation of the notification issued to the controller.

The system is preferably embodied in the form of a self-learning system in that the database is configured to interact with the evaluation unit and/or the controller and is embodied to store the detected sound emission data that are not within a specifiable tolerance range, i.e. for which a significant deviation would be established, in the database.

As was already described as regards the method according to the invention, the data set of sound emission data indicating a defect of the aircraft grows in this way. Sound emission data detected in the future thus have a relatively wide database to refer to so that conclusions can already be drawn during an approach for landing as to which defect is the cause for the significant deviation. This results in the advantage that the data base foundation is continuously improved owing to the design as a self-learning system.

The detected sound emission data that lie within the specifiable tolerance range, i.e. for which no significant deviation has been established, are preferably likewise saved in the database.

The method described and the apparatus described and the system described are suitable in particular for electrically operated VTOLs (also known as eVTOLs). As opposed to helicopters, no noise from turbines or combustion engines or from transmissions or the like arises in the case of these electrically operated VTOLs. The significant deviations that arise in the presence of defects can therefore be detected more easily.

The invention thus represents a reliable possibility for identifying defects of the aircraft that cannot be ascertained, or can be ascertained only with great difficulty, for example by onboard monitoring systems, at an early stage.

BRIEF DESCRIPTION OF THE DRAWINGS

Further preferred features and embodiments of the method according to the invention and of the apparatus according to the invention and of the system according to the invention will be explained below with reference to exemplary embodiments and the figures. The exemplary embodiments and stated dimensions are merely advantageous designs of the invention and are not limiting.

In the figures.

DETAILED DESCRIPTION

Figure 1:
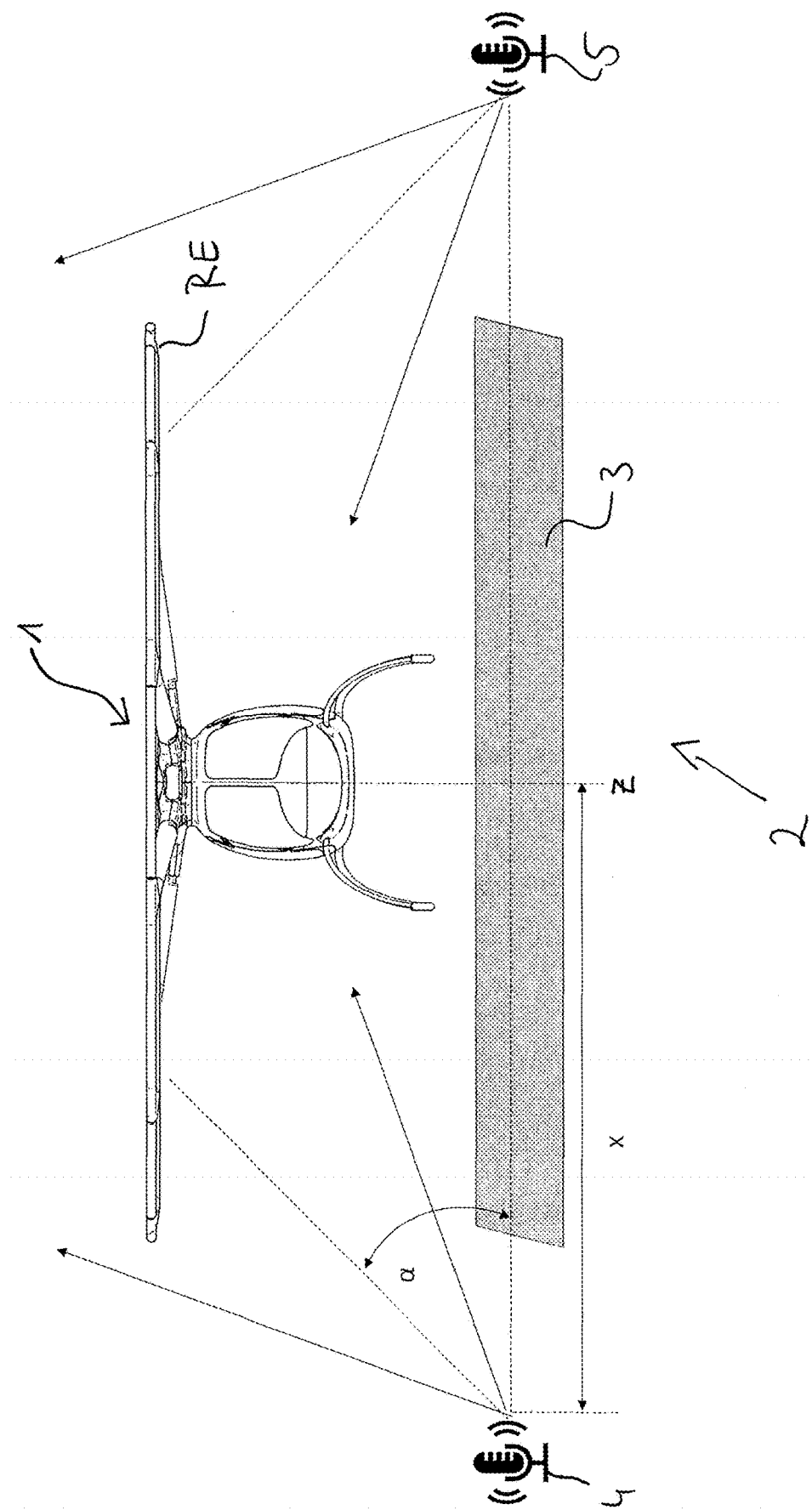
FIG. 1 shows a schematic illustration of a take-off and landing site with an exemplary embodiment of an apparatus according to the invention.

FIG. 1 shows a vertical take-off and landing aircraft 1 during the approach to a take-off and landing site 2.

The take-off and landing site 2 has a monitoring region 3. In the present case, two microphones 4, 5 are arranged around the monitoring region 3. An evaluation unit (not illustrated) is a further part of the apparatus for monitoring the take-off and/or landing procedure of an aircraft.

The microphones 4, 5 detect the sound emission data of the landing aircraft as it approaches the take-off and landing site 2.

The monitoring region 3 is that region of the take-off and landing site 2 that is covered by the microphones 4, 5 in sensor-technological terms to detect sound emissions of the landing aircraft as it approaches. The monitoring region 3 is here not only the corresponding surface area of the take-off and landing site 2 but also the corresponding space, that is to say the volume above the corresponding surface area of the take-off and landing site 2.

The microphones 4, 5 are arranged at a distance x from the center (marked by the dashed line Z) of the monitoring region 3. The distance x in the present case is 30 meters.

The two microphones 4, 5 are oriented to face each other. The microphones 4, 5 in the present case are embodied in the form of directional microphones and have an inclined placement a relative to the ground. In the present case, $\alpha = 45°$.

Aerodynamic noise that arises from the displacement of air by the aircraft 1 as such propagates substantially directly below the aircraft 1 in the direction of the ground. The sound emissions coming from the rotor plane RE propagate particularly strongly in the rotor plane RE, that is to say typically in the horizontal at the height of the aircraft 1, and directly below the aircraft 1. Therefore, there is an angular range that is relatively flat and in which other sources of noise are more easily detectable. In such a relatively flat angular range, the sound emissions due to the aerodynamic noise decrease, and fewer interfering superpositions occur.

Since the defects that constitute a safety risk occur more frequently in or near the rotor plane RE, it is advantageous to detect the sound emissions from the rotor plane RE with as few interfering superpositions as possible.

The sound emissions detected by the microphones 4, 5 are transmitted from the monitoring station to the processor-based evaluation unit for evaluating the sound emission data. The detected sound emission data are here compared to characteristic sound emission data of the same aircraft type that are stored in a database (not illustrated).

If significant deviations are established during the comparison, a notification is issued to a controller (not illustrated).

The controller can be embodied in the form of a central monitoring unit, for example in the form of a ground unit with ground staff at the take-off and/or landing site. Alternatively, the notification can also be issued to the pilot of the aircraft.

If a maintenance request is sent, the aircraft needs to be checked for irregularities before the next departure and needs to be actively cleared so that safe redeployment is ensured.

This method thus represents a reliable possibility for identifying defects of the aircraft that cannot be ascertained, or can be ascertained only with great difficulty, for example by onboard monitoring systems, at an early stage.

In an alternative exemplary embodiment, the microphones 4, 5 are embodied in the form of omnidirectional microphones (not illustrated). In this case, the inclined placement of the microphones relating to the ground is not crucial. Rather, the microphones can be placed such that they are straight.

In order to detect as little interfering aerodynamic noise as possible when measuring the sound emissions, it makes sense to arrange the microphones at a large distance x from the center (marked by the dashed line Z) of the monitoring region 3. In the exemplary embodiment using omnidirectional microphones, the distance in the present case is 60 meters.

Figure 2:
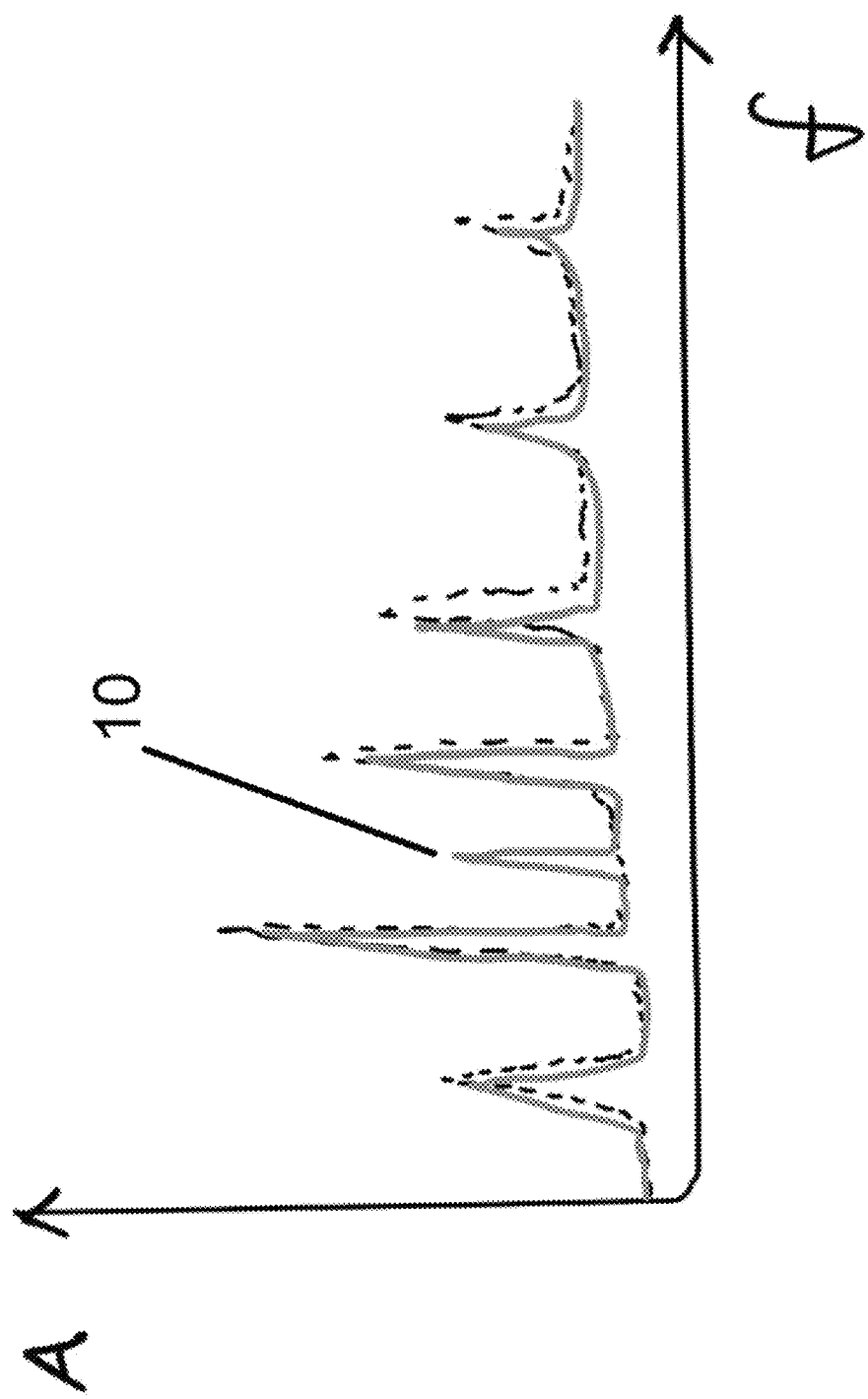
FIG. 2 shows a diagram of the amplitude as a function of the frequency.

The diagram shown in FIG. 2 shows the amplitude A of the sound emissions as a function of the frequency f.

The dashed line shows a spectrum with characteristic sound emission data. The lighter, solid line shows a sound spectrum with detected sound emission data. It can be seen that the spectra even in the case of identical types of aircraft do not match completely but exhibit specific small deviations. However, these small deviations do not indicate defects but are rather due, for example, to environmental conditions, approach and departure speed, or interfering noise.

The reference sign 10 denotes a significant deviation between the detected sound emission data and the characteristic sound emission data. The deviation no longer lies in the tolerance range but rather indicates defects.

LIST OF REFERENCE SIGNS

1 Aircraft
2 Take-off and landing site
3 Monitoring region
4, 5 Microphones
RE Rotor plane
Z Center of the aircraft
10 Significant deviation

The invention claimed is:

1. A method for monitoring at least one of a take-off or landing procedure of an aircraft, the method comprising:

A) monitoring a monitoring region of a take-off and landing site using at least one microphone of a monitoring station to detect sound emission data of the aircraft taking off or landing as the aircraft approaches or departs;
B) transmitting the detected sound emission data from the monitoring station to an evaluation unit;
C) evaluating the detected sound emission data by the evaluation unit by comparing the detected sound emission data to characteristic sound emission data; and
D) the evaluation unit signaling a controller with a notification, and the controller issuing a clearance for take-off in dependence on an evaluation of the notification.

2. The method as claimed in claim 1, wherein the comparison in step C is based on the characteristic sound emission data of a same type of aircraft stored in a database, and the comparison in step C includes comparing at least one of a frequency spectrum or an amplitude of a characteristic approach or departure sound emissions of the same type of aircraft.

3. The method as claimed in claim 1, further comprising:
issuing a notification to the controller if significant deviations between the detected sound emission data and the characteristic sound emission data are identified, including issuing at least one of a maintenance request or a hold on the clearance for take-off.

4. The method as claimed in claim 1, further comprising:
storing detected sound emission data that do not deviate significantly from the characteristic sound emission data in a database.

5. The method as claimed in claim 1, further comprising:
storing detected sound emission data with established significant deviations in a database.

6. The method as claimed in claim 1, further comprising:
measuring environmental data that permit an association of sound emission data with environmental data using environmental sensors.

7. An apparatus for monitoring at least one of take-off or landing procedure of an aircraft, comprising:
a monitoring station with at least one microphone configured to detect sound emission data of the aircraft taking off or landing as the aircraft approaches or departs in a monitoring region of at least one of a take-off or landing site,
at least one evaluation unit that is configured to receive the sound emission data from the monitoring station and is further configured to evaluate the sound emission data by comparing the detected sound emission data to characteristic sound emission data of a same type of aircraft, and
a controller that is configured to receive a notification from the evaluation unit, and a clearance for take-off is issued in dependence on an evaluation of the notification.

8. The apparatus as claimed in claim 7, wherein the monitoring station includes at least two microphones, and the microphones cover the monitoring region of the at least one of the take-off or landing site.

9. The apparatus as claimed in claim 8, wherein the at least two microphones are arranged symmetrically on both sides along an approach or departure path of the aircraft, and the microphones are inclined in relation to a ground area.

10. The apparatus as claimed in claim 8, wherein the at least two microphones have a minimum distance of 20 meters from the at least one of the take-off or landing site.

11. The apparatus as claimed in claim 7, wherein the evaluation unit is configured to send a notification to the controller if there are deviations between the detected sound emission data and the characteristic sound emission data.

12. A system for monitoring at least one of a take-off or landing procedure of an aircraft, comprising:
- a monitoring station with at least one microphone configured to detect sound emission data of the aircraft taking off or landing as the aircraft approaches or departs in a monitoring region of at least one of a take-off or landing site,
- at least one evaluation unit that is configured to receive the sound emission data from the monitoring station and is configured to evaluate the sound emission data by comparing the detected sound emission data to characteristic sound emission data of a same type of aircraft,
- at least one database that is accessible by the evaluation unit and is configured to provide the characteristic sound emission data, and
- a controller that is configured to receive a notification from the evaluation unit, and a clearance for take-off is issued in dependence on an evaluation of the notification.

13. The system as claimed in claim 12, wherein the monitoring station has at least two microphones that cover the monitoring region of the at least one of the take-off or landing site.

14. The system as claimed in claim 13, wherein the at least two microphones are arranged symmetrically on both sides along an approach or departure path of the aircraft, and have an inclined placement in relation to a ground surface.

15. The system as claimed in claim 12, further comprising:
- the evaluation unit is configured to send a notification to the controller if there are deviations between the detected sound emission data and the characteristic sound emission data.

16. The system as claimed in claim 15, wherein the system is embodied as a self-learning system and the database is configured to interact with at least one of the evaluation unit or the controller and is embodied to store detected sound emission data that are within a specifiable tolerance range in the database.

* * * * *